United States Patent
Lee

(10) Patent No.: US 11,235,455 B2
(45) Date of Patent: Feb. 1, 2022

(54) MASTER AND SLAVE OF ROBOT TOOL CHANGING SYSTEM

(71) Applicant: LG ELECTRONICS INC., Seoul (KR)

(72) Inventor: Dong Hyeong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 206 days.

(21) Appl. No.: 16/572,253

(22) Filed: Sep. 16, 2019

(65) Prior Publication Data

US 2020/0009717 A1   Jan. 9, 2020

(30) Foreign Application Priority Data

May 28, 2019 (WO) ................ PCT/KR2019/006395

(51) Int. Cl.
*B25J 3/00* (2006.01)
*B25J 9/00* (2006.01)

(52) U.S. Cl.
CPC ............... *B25J 3/00* (2013.01); *B25J 9/0084* (2013.01)

(58) Field of Classification Search
CPC ...................................... B25J 3/00; B25J 9/00
See application file for complete search history.

(56) References Cited

U.S. PATENT DOCUMENTS

| | | | |
|---|---|---|---|
| 2012/0215348 A1* | 8/2012 | Skrinde | B25J 11/0085 700/245 |
| 2014/0077647 A1* | 3/2014 | Vivier | H02K 53/00 310/152 |
| 2015/0114149 A1* | 4/2015 | Gomi | B25J 5/00 74/89.14 |
| 2017/0057085 A1 | 3/2017 | Cookson et al. | |
| 2017/0120454 A1* | 5/2017 | Ferguson | B25J 15/0441 |
| 2018/0009113 A1* | 1/2018 | Lauder | B25J 15/0433 |
| 2019/0299321 A1* | 10/2019 | Kteily | B23K 9/328 |

FOREIGN PATENT DOCUMENTS

| | | |
|---|---|---|
| CN | 208483869 U | 2/2019 |
| JP | 3146303 B2 | 3/2001 |
| JP | 2016-30320 A | 3/2016 |
| KR | 10-2010-0083559 A | 7/2010 |
| KR | 10-2010-0089799 A | 8/2010 |
| KR | 10-1453832 B1 | 10/2014 |

\* cited by examiner

*Primary Examiner* — Kira Nguyen
(74) *Attorney, Agent, or Firm* — Birch, Stewart, Kolasch & Birch, LLP

(57) ABSTRACT

A slave combining with a master in a robot tool changing system is disclosed. The slave includes a combination groove into which a protrusion of the master is inserted, at least one plate displacement measuring module arranged at a circumferential edge of a hole of the combination groove, and a slave communicator for communicating with the master. Accordingly, a robot tool changing system including an artificial intelligence (AI) function and performing 5G communications may be provided.

13 Claims, 8 Drawing Sheets

[Fig. 1]
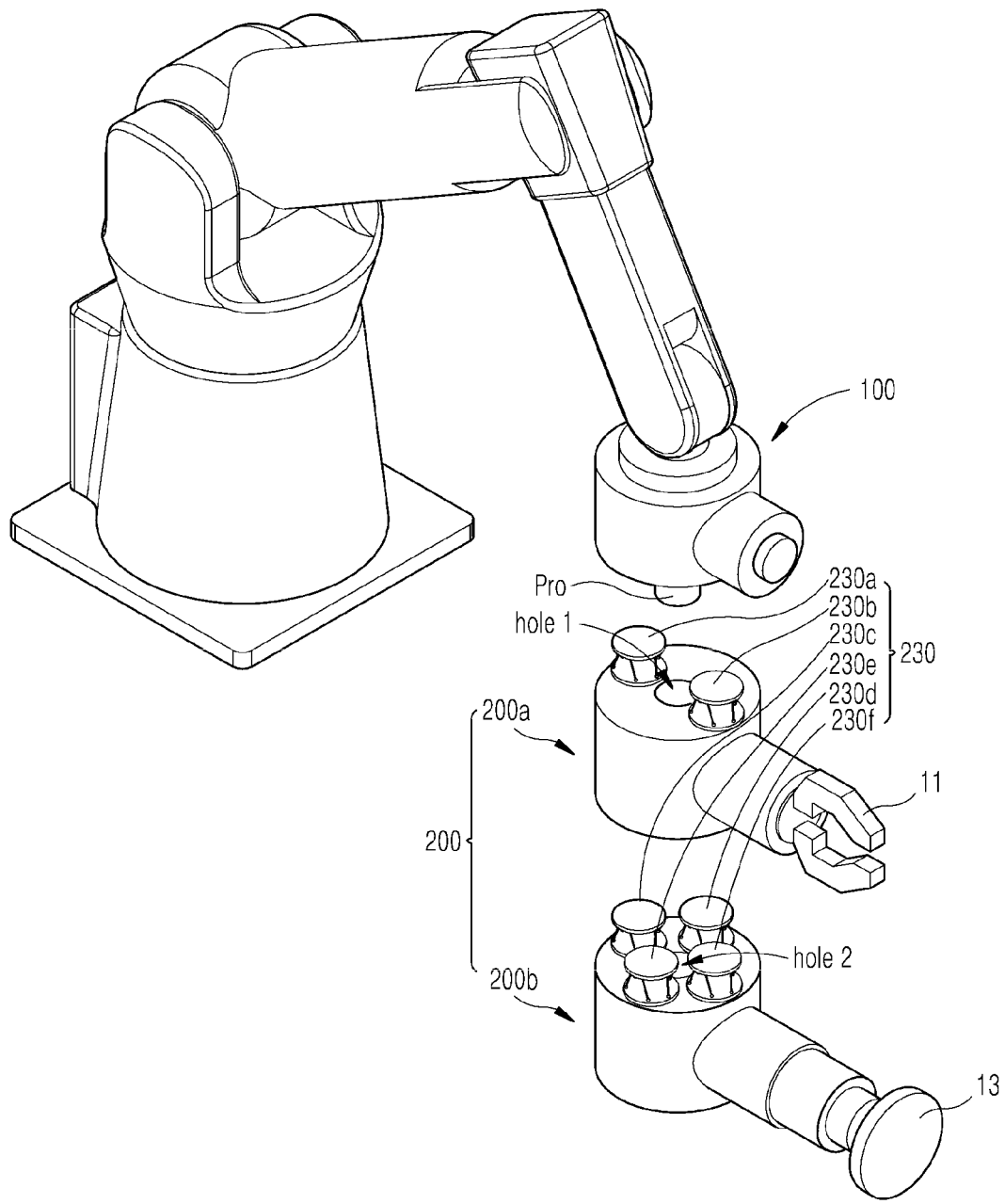

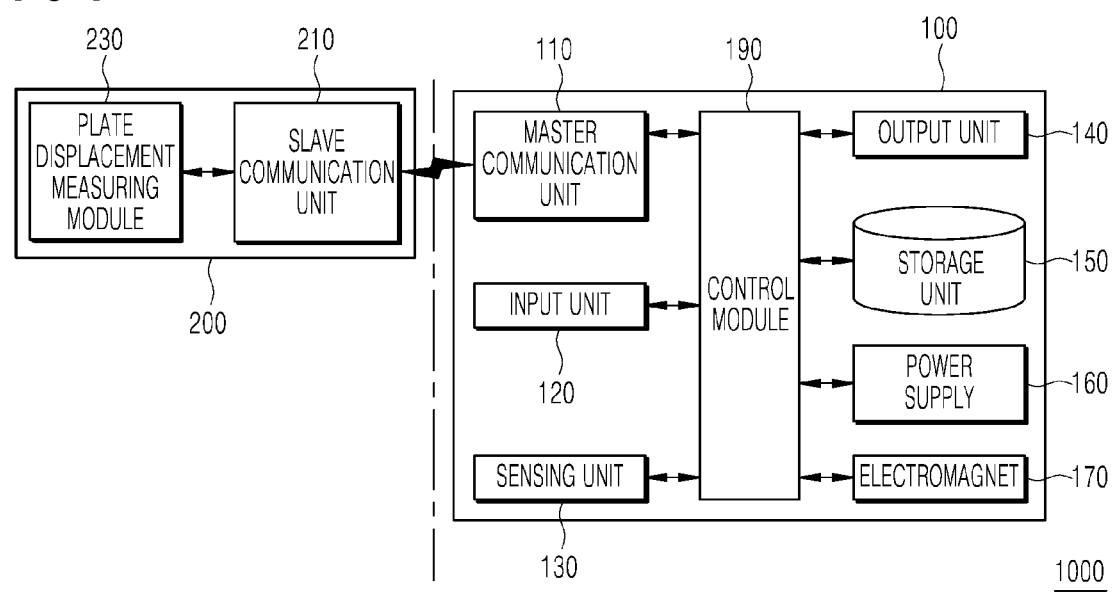
[Fig. 2]

[Fig. 3]
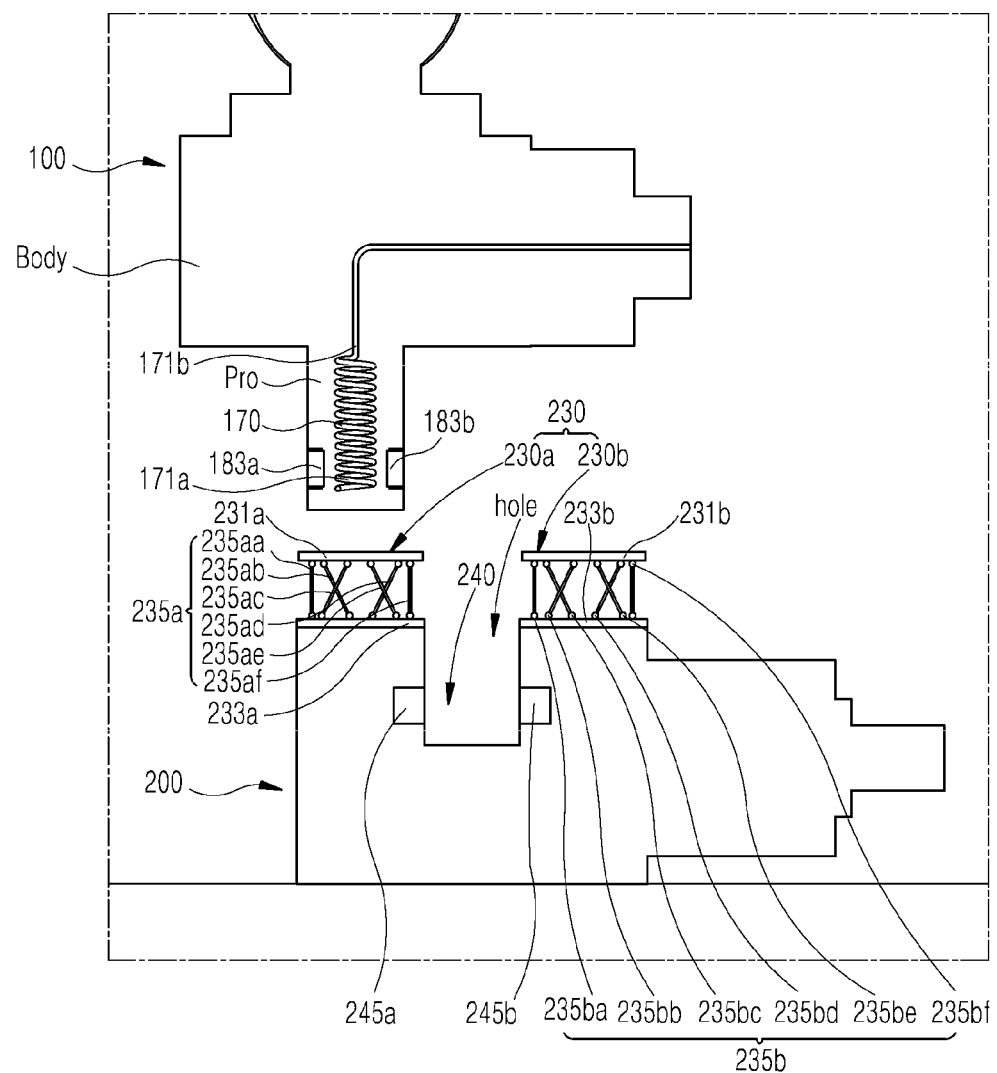

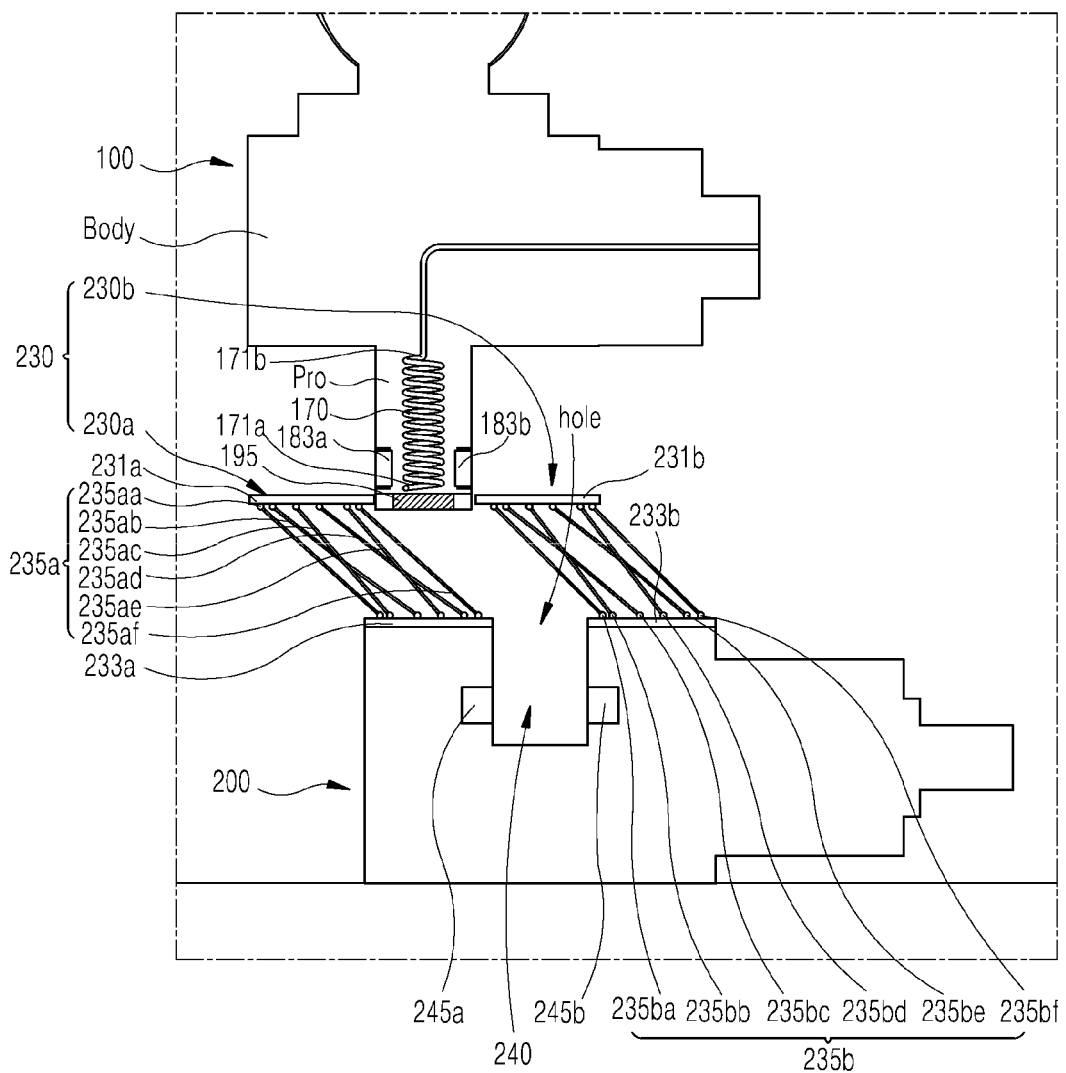
[Fig. 4]

[Fig. 5]
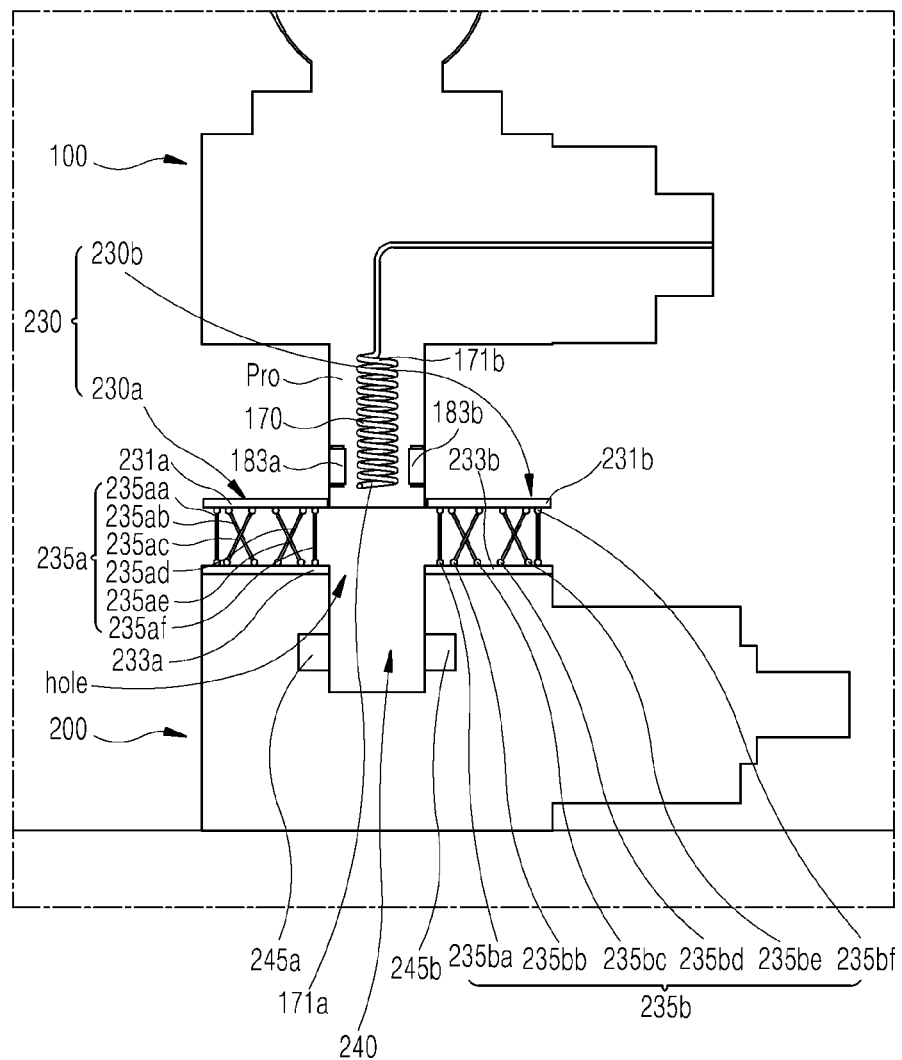

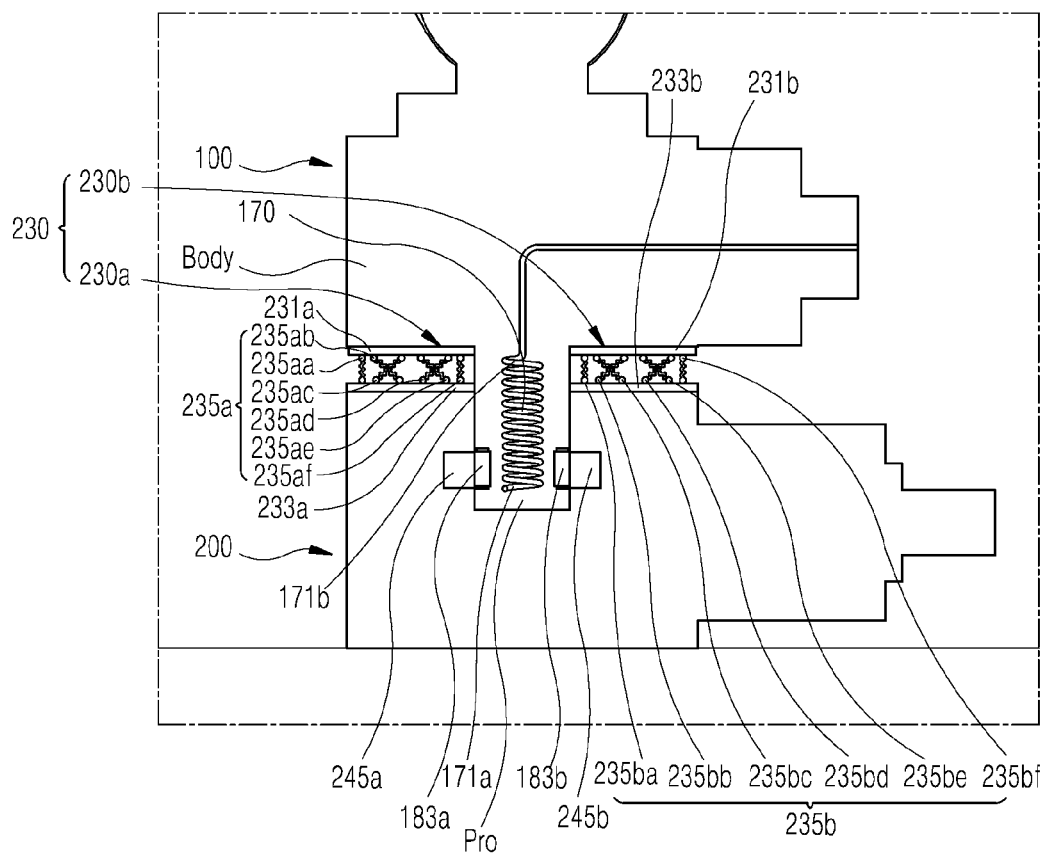
[Fig. 6]

[Fig. 7]
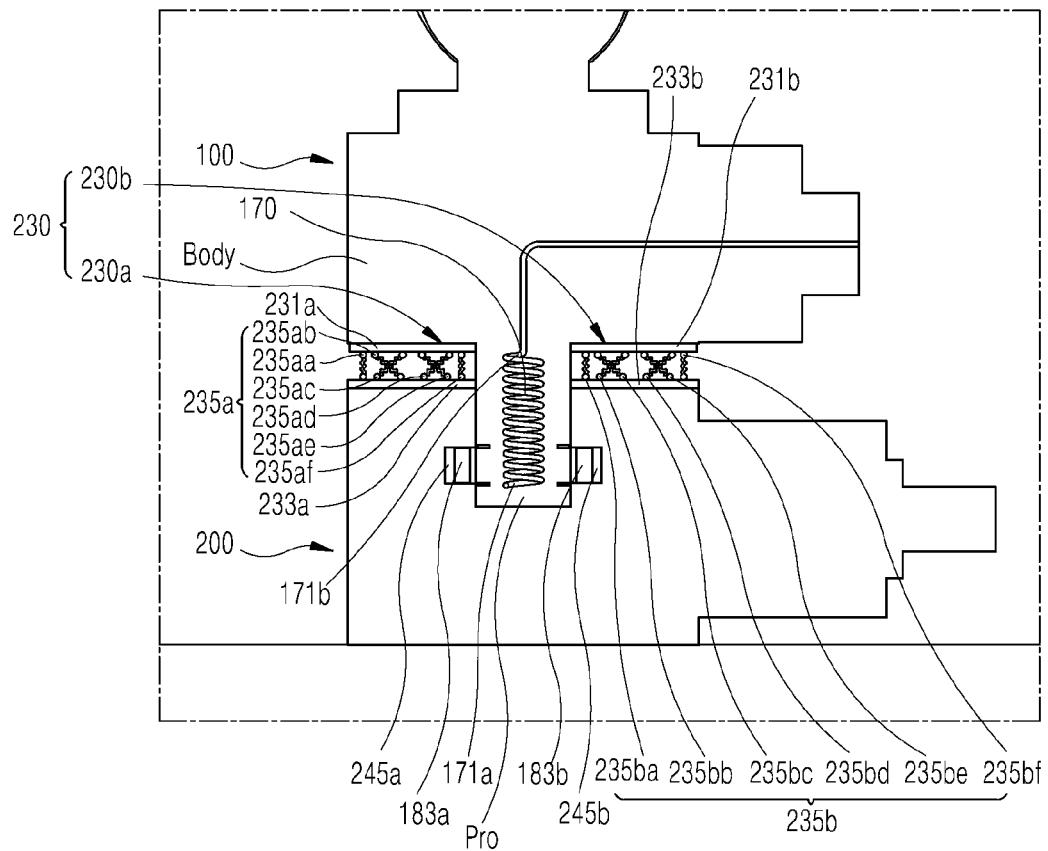
[Fig. 8]
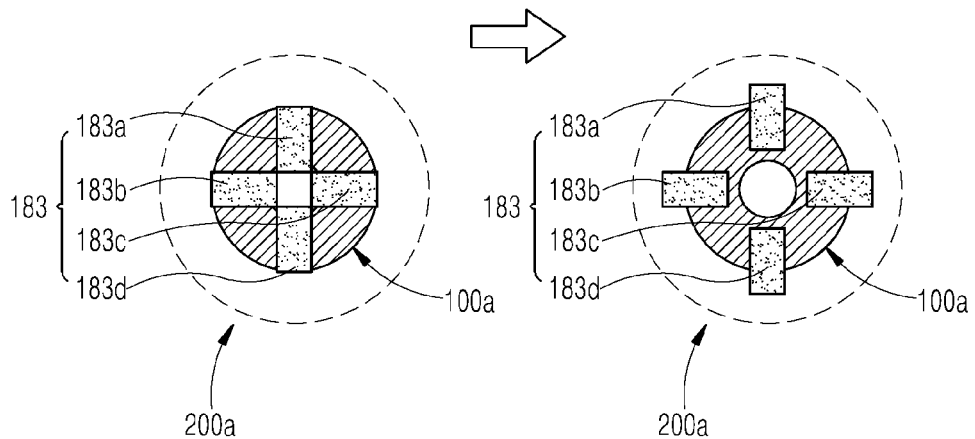

[Fig. 9]
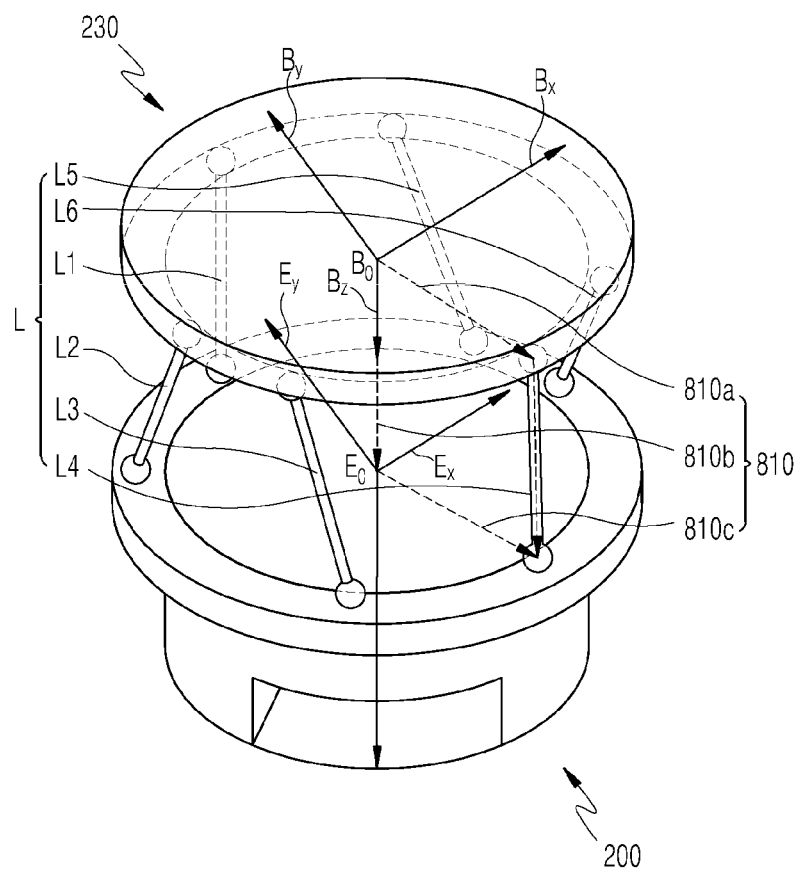

MASTER AND SLAVE OF ROBOT TOOL CHANGING SYSTEM

CROSS-REFERENCE TO RELATED APPLICATION

This present application claims benefit of priority to PCT Patent Application No. PCT/KR2019/006395, entitled "Master and slave of robot tool changing system," filed on May 28, 2019, in the World Intellectual Property Organization, the entire disclosure of which is incorporated herein by reference.

BACKGROUND

1. Field of the Invention

The present disclosure relates to a master and at least one slave in a robot tool changing system.

2. Description of Related Art

Production performed by a robot basically involves the same work being repeatedly performed by a robot hand, which operates in a precise manner in accordance with a preprogram. When assembly of parts or structures of the parts are complex, productivity may improve when one robot hand is made to perform a plurality of tasks.

For this purpose, tool changing systems having various functions in which tools for enabling one robot hand to perform different tasks may be selectively mounted are being actively developed.

A robot hand tool changer disclosed in Korean Patent Application No. 101453832B (hereinafter referred to as "Related Art 1"), includes a sealer tool capture, a sealer tool, a home positioner, a stand, a parking cylinder, a parking linker, and a sealer tool parking device. In the tool changer disclosed in Related Art 1, at least two kinds of tools are selectively attached and detached to and from one robot hand.

Korean Patent Application No. 20100083559A (hereinafter referred to as "Related Art 2"), discloses a tool changer in which a master combined with a robot is inserted into and combined with a slave so as to prevent a gripped object from falling, due to an erroneous operation during a tool change.

However, since conventional tool changers are driven by a pneumatic method, the conventional tool changers cannot be driven only by changer hardware, and require additional facilities such as a compressor, a solenoid valve, and a pneumatic line.

SUMMARY OF THE INVENTION

The present disclosure is directed to providing a robot tool changing system in which a master and a slave may be combined with each other without using high-priced pneumatic equipment.

The present disclosure is further directed to providing a robot tool changing system in which a master and a slave may be correctly and precisely combined with each other.

The present disclosure is further directed to providing a robot tool changing system in which a master and a slave may be firmly combined with each other.

The present disclosure is not limited to what has been described above. Other aspects that are not mentioned above may be clearly understood by those skilled in the art.

In a tool changing system according to an embodiment of the present disclosure, a magnet (or an electromagnet) is arranged in a combining site of a master and a slave so as to fasten the master and the slave to each other. In detail, in the tool changing system according to this embodiment of the present disclosure, the master combining with at least one slave includes a body and a protrusion protruding in one direction from the body and inserted into a combination groove of the slave, and may include an electromagnet arranged in a predetermined internal region of the protrusion.

In the tool changing system according to this embodiment of the present disclosure, the slave that is combined with the master includes the combination groove into which the protrusion of the master is inserted, and at least one plate displacement measuring module arranged at a circumferential edge of a hole of the combination groove. Each of the at least one plate displacement measuring modules may include a lower plate, an upper plate, and at least one elastic connection leg for connecting the lower plate and the upper plate.

When power is applied to the electromagnet of the master and the upper plates are moved to a magnetic coupling region of the protrusion by magnetism, each of the at least one plate displacement modules may transmit, to the master, position error information between the upper plates and the lower plates connected to the upper plates, through the slave communication unit. Therefore, the master may be correctly and precisely combined with the slave.

A master according to an embodiment of the present disclosure includes at least one fastening part, and the fastening part may be rectangular or cylindrical. The fastening part is arranged in a fastening fixing groove positioned in a combination groove of a slave so as to firmly combine the master and the slave with each other.

The present disclosure are not limited to what has been described above. Other aspects that are not described above may be clearly understood by those skilled in the art from the following description.

According to various embodiments of the present disclosure, the following effects may be obtained.

First, since a master and a slave may be firmly combined with each other without using high-priced pneumatic equipment, an economical tool changing system may be provided.

Second, since a displacement measuring module is arranged in the slave, the slave may be precisely combined with the master.

Third, since a cylindrical fastening part is provided, unlike a conventional globular fastening part, the master and the slave may be firmly combined with each other.

BRIEF DESCRIPTION OF DRAWINGS

The foregoing and other objects, features, and advantages of the disclosure, as well as the following detailed description of the embodiments, will be better understood when read in conjunction with the accompanying drawings. For the purpose of illustrating the disclosure, there is shown in the drawings an exemplary embodiment that is presently preferred, it being understood, however, that the disclosure is not intended to be limited to the details shown because various modifications and structural changes may be made therein without departing from the spirit of the disclosure and within the scope and range of equivalents of the claims. The use of the same reference numerals or symbols in different drawings indicates similar or identical items.

FIG. 1 is a view schematically illustrating a tool changing system including a master and at least one slave according to an embodiment of the present disclosure.

FIG. 2 is a block diagram illustrating configurations of a master and a slave according to an embodiment of the present disclosure.

FIGS. 3 to 7 are views sequentially illustrating processes of combining the master and the slave with each other according to an embodiment of the present disclosure.

FIG. 8 is a view conceptually illustrating fixing of fastening parts of a master to fastening fixing grooves of a slave according to an embodiment of the present disclosure.

FIG. 9 is a view illustrating a plate displacement measuring module positioned on a slave according to an embodiment of the present disclosure.

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.
It will be understood that although the terms first, second, etc. may be used herein to describe various elements, these elements should not be limited by these terms. These terms are generally only used to distinguish one element from another.
It will be understood that when an element is referred to as being "connected with" another element, the element can be connected with the other element or intervening elements may also be present. In contrast, when an element is referred to as being "directly connected with" another element, there are no intervening elements present.
A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Hereinafter, an embodiment disclosed in the current specification will be described in detail with reference to the accompanying drawings. The same component is denoted by the same reference numeral and description thereof will not be given. In addition, in describing the embodiment disclosed in the current specification, when it is determined that detailed description of a related well-known technology may blur the gist of the embodiment disclosed in the current specification, detailed description thereof will be omitted.

FIG. 1 illustrates a tool changing system 1000 including a master 100 and a slave 200 according to an embodiment of the present disclosure.

The master 100, as a master device to be combined with the slave 200, may include various robots or robot arms, and may include a protrusion Pro at an end thereof. According to an embodiment of the present disclosure, the master 100 may be implemented as a device separate from the robots or the robot arms and combined with the robots or the robot arms.

The slave 200, as a slave device to be combined with the master 100, may include a first slave 200a and a second slave 200b. The first slave 200a includes a gripper 11 and may grip an object. The second slave 200b includes a charge module 13 and may charge an object to be charged. Both the gripper 11 and the charge module 13 are exemplary, and various devices and parts having various functions may be mounted in the slave 200.

The slave 200 may include at least one plate displacement measuring module 230. Referring to FIG. 3, a plate displacement measuring module 230a includes an upper plate 231a, a lower plate 233a, and at least one elastic connection leg (235a in FIG. 3) for connecting the two plates 231a and 233a. The first slave (200a in FIG. 1) includes two plate displacement measuring modules 230a and 230b, and the second slave (200b in FIG. 1) may include four plate displacement measuring modules 230c to 230f.

Hereinafter, configurations of the master 100 and the slave 200 according to an embodiment of the present disclosure will be described with reference to FIG. 2.

First, the master 100 may include a master communication unit 110, an input unit 120, a sensing unit 130, an output unit 140, a storage unit 150, a power supply 160, an electromagnet 170, and a control module 190. However, the components illustrated in FIG. 2 are not essential to implementation of the master 100, and the master 100 described in the current specification may have more or fewer components than the above-described components.

In more detail, among the above components, the master communication unit 110 may include at least one wired or wireless communication module that may enable communication between the master 100 and the slave 200, and between the master 100 and a device including a communication module. The master communication unit 110 may include a mobile communication module and a short range communication module. In some implementations, the master communication unit 110 may be implemented a communicator. In some implementations, the master communication unit 110 comprises at least one of a communicator or consists of at least one of a communicator.

The input unit 120 may include a camera or an image input unit for inputting an image signal, a microphone or an audio input unit for inputting an audio signal, and a user input unit (for example, a touch key or a mechanical key) for receiving information from a user. Voice data or image data collected by the input unit 120 is analyzed, and may be processed by a control instruction of the user. In some implementations, input unit 120 may be implemented inputter or input interface. In some implementations, input unit 120 comprises at least one of inputter or consists of at least one of inputter. In some implementations, input unit 120 may be configured to input data and signals.

The sensing unit 130 may include at least one sensor for sensing at least one among information on the master 100, peripheral environment information of the master 100, and user information. For example, the sensing unit may include at least one among a proximity sensor, an illumination sensor, a touch sensor, an acceleration sensor, a magnetic sensor, a gravity sensor, a gyroscope sensor, a motion sensor, an KGB sensor, an infrared (IR) sensor, a finger scan sensor, an ultrasonic sensor, an optical sensor (for example, a camera), a microphone, a weight sensor, a battery gauge, an environment sensor (for example, a barometer, a hygrometer, a thermometer, a radiation detection sensor, a heat sensor, or a gas sensor), and a chemical sensor (for example, an electronic nose, a healthcare sensor, or a biometric sensor). Further, the master 100 disclosed in the current specification may combine information sensed by at least two sensors among the above sensors with each other, and may utilize the combination result.

The output unit 140 for generating an output related to sight, hearing, or touch may include at least one among a display (or a plurality of displays), at least one light emitting device, a sound output unit, and a haptic module. The display has a mutual layer structure with the touch sensor or is integrated with the touch sensor, and may be implemented as a touch screen. The touch screen functions as a user input unit for providing an input interface between the master 100 and the user, and may also provide an output interface between the master 100 and the user.

The storage unit 150 stores data for supporting various functions of the master 100. The storage unit 150 may store a plurality of application programs driven by the master 100, and data and instructions for operating the master 100. At least some of the application programs may be downloaded from an external server via wireless communications.

The power supply 160 receives external power and internal power, and supplies power to the components of the master 100 under the control of the control module 190. The power supply 160 includes a battery. The battery may be a built-in battery or an exchangeable battery. The battery may be charged by a wired or wireless charging method. The wireless charging method may include a magnetic induction method or a magnetic resonance method. In some implementations, the control module 190 may be implemented a controller. In some implementations, the control module 190 comprises at least one of a controller or consists of at least one of a controller.

The electromagnet 170 may receive power through the power supply 160, and may magnetize a specific portion (the protrusion) of the master 100 when power is supplied.

Further, the slave 200 may include a slave communication unit 210 and a plate displacement measuring module 230.

The slave communication unit 210, as a module that communicates with the master communication unit 110, may include the short range communication module. The short range communication module may include Bluetooth™, radio frequency identification (RFID), infrared data association (IrDA), ultra-wideband (UWB), ZigBee, near field communication (NFC), wireless-fidelity (Wi-Fi), Wi-Fi direct, and a wireless universal serial bus (USB). The slave communication unit 210 comprises at least one of a slave communicator. In some implementations, the slave communication unit 110 may be implemented a communicator. In some implementations, the slave communication unit 110 comprises at least one of a communicator or consists of at least one of a communicator.

When the plate displacement measuring module 230 is combined with the master 100, the plate displacement measuring module 230 may guide and move the master 100 to a combining site. When the master 100 and the slave 200 are combined with each other, since a small error (for example, of 1 cm) may occur, the plate displacement measuring module 230 may induce an accurate combination between the master 100 and the slave 200. The plate displacement measuring module 230 comprises at least one of a plate displacement measurer or consists of at least one of a plate displacement measurer. The plate displacement measurer is configured to guide and move the master 100 to a combining site.

With reference to FIG. 3, the plate displacement measuring module 230a may include the lower plate 233a, the upper plate 231a, and the at least one elastic connection leg 235a for connecting the two plates 231a and 233a. The upper plate 231a may include a permanent magnet. The lower plate 233a may include a permanent magnet or may be fixed to a predetermined region of the slave 200.

FIGS. 3 to 7 are views sequentially illustrating processes of combining the master 100 and the slave 200 with each other according to an embodiment of the present disclosure. Cross-sections of the master 100 and the slave 200 may be illustrated.

Referring to FIG. 3, the master 100 may be combined with the slave 200, and may include a body and the protrusion Pro that protrudes from the body in one direction. The protrusion Pro may be cylindrical, and may be inserted into a combination groove 240 of the slave 200. According to an implementation example, the protrusion may be provided in the slave 200, and the combination groove 240 may be arranged in the master 100.

The electromagnet 170 may be arranged in the protrusion Pro. The electromagnet 170 may be arranged in the center of the protrusion Pro in the form of a coil, and may be magnetized when power is supplied. In the present specification, when power is supplied in one direction, a lower portion 171a of the electromagnet 170 may be positive and an upper portion 171b of the electromagnet 170 may be negative, and when power is supplied in another direction, the lower portion 171a of the electromagnet 170 may be negative and the upper portion 171b of the electromagnet 170 may be positive. A circuit for changing a magnetized position may be provided in the master 100.

Fastening parts 183a and 183b arranged in a predetermined region of the protrusion Pro may be respectively fixed to fastening fixing grooves 245a and 245b of the combination groove 240. The fastening parts 183a and 183b may be formed of permanent magnets, and may be negative. However, the fastening parts 183a and 183b may be differently implemented according to an embodiment. In addition, although two fastening parts are illustrated as being provided, two or more fastening parts may be provided.

Next, the slave 200 may include the combination groove 240 into which the protrusion Pro of the master 100 is inserted. The combination groove 240 may be cylindrical or rectangular. However, the combination groove 240 may be differently implemented in accordance with the shape of the protrusion Pro of the master 100. The fastening fixing grooves 245a and 245b are arranged in the combination groove 240 so that the fastening parts 183a and 183b of the master 100 may be fixed to the combination groove 240.

The plate displacement measuring module 230 may be implemented as the at least two plate displacement measuring modules 230a and 230b, which are arranged at a circumferential edge of a hole of the combination groove 240. The plate displacement measuring module 230 may include lower plates 233a and 233b, upper plates 231a and 231b, and one or more elastic connection legs 235a and 235b for connecting the lower plates 233a and 233b to the upper plates 231a and 231b.

In an embodiment, the lower plates 233a and 233b may be fixed to the circumferential edge of the combination groove 240. In particular, the lower plates 233a and 233b may include permanent magnets, and may be fixed to the circumferential edge of the combination groove 240 by magnetic force.

When power is not applied to the electromagnet 170 and the electromagnet is thus nonpolar in FIG. 3, and power is applied in one direction in FIGS. 4 to 6, the lower portion 171a of the electromagnet 170 may be positive and the upper portion 171b of the electromagnet 170 may be negative. In FIGS. 3 to 7, the fastening parts 183a and 183b may be negative, and the upper plates 231a and 231b may be negative.

Referring to FIG. 4, when power is applied in one direction, the lower portion 171a of the electromagnet 170 may be positive and the upper portion 171b of the electromagnet 170 may be negative, and the upper plates 231a and 231b of the plate displacement measuring module 230 may be moved to a magnetic coupling region of the master 100 by magnetism. Here, the magnetic coupling region is arranged at the end of the protrusion Pro and the upper plates 231a and 231b are attached to the magnetic coupling region by magnetism.

When a vertical position error occurs in the upper plates 231a and 231b of the first plate displacement measuring module 230a and the second plate displacement measuring module 230b in a predetermined range, the slave 200 may inform the master 100 of the occurrence of the vertical position error. Here, the predetermined range may be a range which is such that a problem occurs in the combination between the slave 200 and the master 100.

That is, unlike in FIG. 4, when the upper plates 231a and 231b are not moving side by side with the magnetic coupling region of the master 100, the slave 200 may inform the master 100 that the upper plates 231a and 231b are not moving side by side with the magnetic coupling region of the master 100. The master 100 may release the magnetic combination between the master 100 and the upper plates 231a and 231b by not applying power to the electromagnet 170, and after realigning a position of the protrusion Pro may then apply power to the electromagnet 170 again.

Here, an insulating region 195 may be formed by an insulator in a partial region of the protrusion Pro 195, adjacent to the magnetic coupling region. Even when power is applied to the electromagnet 170, the upper plates 231a and 231b are not magnetically attached to the insulating region 195.

Here, the magnetic coupling region and the insulating region 195 may be differently implemented from FIG. 4, in accordance with a structure of the electromagnet 170 and the shape of the protrusion Pro.

When the upper plates 231a and 231b are attached normally to the magnetic coupling region, the slave 200 calculates position error information of the upper plates 231a and 231b and the lower plates 233a and 233b, and may provide the calculated position error information to the master 100. Here, a method by which the calculated position error information is provided to the master 100 is a short range communication. However, the present disclosure is not limited thereto.

Referring to FIG. 5, from a state in which the master 100 and the slave 200 are not horizontally aligned with each other, the master 100 and the slave 200 may be brought into horizontal alignment by moving the protrusion Pro based on the position error information provided by the slave 200. At this time, the protrusion Pro may be moved by the elastic connection legs 235a and 235b in a downward direction to a predetermined degree.

That is, the master 100 may adjust a combination width of the protrusion Pro and the combination groove 240, based on the position error information provided by the slave 200.

Referring to FIG. 6, when the protrusion Pro and the combination groove 240 are aligned in a predetermined range, the control module 190 may move the protrusion Pro in a directly downward direction to insert the protrusion Pro into the combination groove 240. By this time, the lower portion 171a of the electromagnet 170 is positive and the upper portion 171b of the electromagnet 170 is negative.

Referring to FIG. 7, when the protrusion Pro is inserted into the combination groove 240, the control module 190 of the master 100 may arrange the fastening parts 183a and 183b in the fastening fixing grooves 245a and 245b of the slave 200 by applying power so as to change a magnetization direction of the electromagnet 170. That is, the lower portion 171a of the electromagnet 170 is set to be negative and the upper portion 171b of the electromagnet 170 is set to be positive, so that the fastening parts 183a and 183b set to be negative may be moved to the outside of the protrusion Pro by a repulsive force. Here, a magnetic field formed in the lower portion 171a and the upper portion 171b of the electromagnet 170 may be implemented by, for example, a current direction changing module or a circuit design. In addition, the fastening parts 183a and 183b may be cylindrical or rectangular.

FIG. 8 is a view illustrating movement of the fastening parts 183a to 183d by magnetism from the protrusion Pro of the master 100 into the fastening fixing grooves of the slave 200.

Referring to FIG. 8, from a state in which a fastening part 183 of the master 100 is arranged not to protrude from the protrusion Pro by magnetism of the electromagnet 170, the fastening part 183 may move to the outside of the protrusion Pro and into the fastening fixing grooves when another magnetism is generated in the electromagnet 170. The fastening parts 183 may be rectangular or cylindrical. Accordingly, a fastening strength may increase.

FIG. 9 is a view illustrating the plate displacement measuring module 230 positioned on the slave 200 according to an embodiment of the present disclosure.

When power is applied to the electromagnet 170 of the master 100 and an upper plate is moved to the magnetic coupling region of the protrusion Pro by magnetism, the plate displacement measuring module 230 may transmit, to the master 100, position error information between the upper plate and a lower plate corresponding to the upper plate, through the slave communication unit 210. The master 100 may receive the corresponding information through the master communication unit 110.

The control module 190 moves the protrusion Pro based on the horizontal direction position error information between the upper plate and the lower plate, received through the master communication unit 110. When the protrusion Pro and the combination groove are aligned, the control module 190 may move the protrusion Pro in a directly downward direction to insert the protrusion Pro into the combination groove. The control module 190 comprises at least one of a controller.

Referring to FIG. 9, each of elastic connection legs L1 to L6 may have a linear variable differential transform (LVDT) structure, and include an LVDT body and core. A length to which the elastic connection legs extend by the LVDT body and core may be accurately measured.

The plate displacement measuring module 230 may calculate displacement information of each of the elastic connection legs (for example, leg L4) based on at least one among extended length information of each of the elastic connection legs (for example, L4), displacement information 810b of each of the elastic connection legs (for example, L4) from the center of the upper plate to the center of the lower plate, displacement information 810c from the center of the lower plate to an elastic connection leg that contacts the lower plate, and displacement information 810a from the center of the upper plate to an elastic connection leg that contacts the upper plate. The displacement information of L4 may be calculated as 810b+810c−810a, and the displacement information may be a vector value.

Based on the displacement information, the plate displacement measuring module 230 may calculate a position error between the lower plate and the upper plate, and may provide the calculated position error to the master 100. The master 100 may move to the protrusion Pro based on the calculated position error.

The above-described present disclosure may be implemented in a program recording medium as a computer readable code. A computer readable medium includes all kinds of recording device for storing data that may be read by a computer system. The computer readable medium may be, for example, a hard disk drive (HDD), a solid state disk (SSD), a silicon disk drive (SDD), read only memory (ROM), random access memory (RAM), CD-ROM, a magnetic tape, a floppy disk, or an optical data storage device. In addition, the computer may include the control module 190 of the master 100.

Many modifications to the above embodiments may be made without altering the nature of the disclosure. The dimensions and shapes of the components and the construction materials may be modified for particular circumstances. While various embodiments have been described above, it should be understood that they have been presented by way of example only, and not as limitations.

What is claimed is:

1. A slave combining with a master in a robot tool changing system, the slave comprising:
    a combination groove into which a protrusion of the master is inserted;
    at least one plate displacement measurer arranged at a circumferential edge of a hole of the combination groove, and including a lower plate, an upper plate arranged in an upper direction to correspond to the lower plate, and at least one elastic connection leg for connecting the upper plate and the lower plate; and
    a slave communicator for communicating with the master,
    wherein the upper plate comprises a permanent magnet, and
    wherein, when power is applied to an electromagnet of the master so that the upper plate is moved to a magnetic coupling region of the protrusion by magnetism, the plate displacement measurer transmits, to the master, position error information between the upper plate and the lower plate connected to the upper plate, through the slave communicator.

2. The slave of claim 1, wherein at least one fastening fixing groove is arranged in the combination groove, and
    wherein, when the protrusion is inserted into the combination groove and power is applied to the electromagnet of the master, the fastening part of the master is fixed to the fastening fixing groove.

3. The slave of claim 1, wherein each of the at least one plate displacement measurer calculates the position error information based on at least one among extended length information of each of the at least one elastic connection legs, displacement information from a center of the upper plate to a center of the lower plate, displacement information from the center of the lower plate to an elastic connection leg that contacts the lower plate, and displacement information from the center of the upper plate to an elastic connection leg that contacts the upper plate.

4. The slave of claim 1, wherein the lower plate is fixed to the circumferential edge of the hole of the combination groove.

5. The slave of claim 4, wherein the lower plate comprises a permanent magnet, and
    wherein the lower plate is fixed to the circumferential edge of the hole of the combination groove by magnetism.

6. The slave of claim 1, wherein; when vertical positions of the upper plates are different from each other in a predetermined range, vertical error information is transmitted to the master through the slave communicator.

7. A master combining with at least one slave in a robot tool changing system, the master comprising:
    a body;
    a protrusion protruding from the body in one direction and which is inserted into a combination groove of a slave;
    at least one fastening part arranged in a predetermined region of the protrusion and fixing the protrusion to the combination groove;
    an electromagnet arranged in a predetermined internal region of the protrusion;
    a master communicator for communicating with the slave; and
    a controller,
    wherein, when power is applied to the electromagnet so that upper plates of the slave are moved by magnetism to a magnetic coupling region of the protrusion, the controller controls the master communicator to receive, from the slave, position error information between the upper plates and lower plates of the slave, and
    wherein, when power is applied to the electromagnet and a vertical position error is measured by at least one plate displacement measurer of the slave in a vertical direction of the upper plates of the slave in a predetermined range, the controller receives the position error information in the form of the vertical position error from the slave through the master communicator.

8. The master of claim 7, wherein the controller moves the protrusion based on horizontal direction position error information between the upper plates and the lower plates, which is received through the master communicator, and
    wherein, when the protrusion and the combination groove are aligned with each other, the controller moves the protrusion in a directly downward direction to insert the protrusion into the combination groove.

9. The master of claim 8, wherein, when the protrusion is inserted into the combination groove, the controller applies power so as to change a magnetization direction of the electromagnet, and fixes the fastening part to the fastening fixing groove of the slave.

10. The master of claim 7, wherein the fastening parts are plural, and
    wherein each of the fastening parts have a rectangular shape.

11. The master of claim 7, wherein an insulator is arranged in a partial region of the protrusion, adjacent to the magnetic coupling region.

12. The master of claim 7, wherein the controller stops applying power to the electromagnet, and separates the upper plates from the protrusion.

13. The master of claim 12, wherein the controller realigns a position of the protrusion and applies power to the electromagnet again.

\* \* \* \* \*